United States Patent
Abrishamkar et al.

(10) Patent No.: US 10,731,882 B2
(45) Date of Patent: Aug. 4, 2020

(54) OPERATING A CLIMATE CONTROL SYSTEM BASED ON OCCUPANCY STATUS

(71) Applicant: Lennox Industries, Inc., Richardson, TX (US)

(72) Inventors: Farhad Abrishamkar, Dallas, TX (US); Anna Vishinsky, Little Elm, TX (US); Alan E. Bennett, Denton, TX (US)

(73) Assignee: Lennox Industries Inc., Richardson, TX (US)

( * ) Notice: Subject to any disclaimer, the term of this patent is extended or adjusted under 35 U.S.C. 154(b) by 191 days.

(21) Appl. No.: 15/785,101

(22) Filed: Oct. 16, 2017

(65) Prior Publication Data

US 2018/0106491 A1 Apr. 19, 2018

Related U.S. Application Data

(60) Provisional application No. 62/409,068, filed on Oct. 17, 2016.

(51) Int. Cl.
*F24F 11/00* (2018.01)
*F24F 11/50* (2018.01)
(Continued)

(52) U.S. Cl.
CPC .......... *F24F 11/0001* (2013.01); *F24F 11/30* (2018.01); *F24F 11/50* (2018.01); *F24F 11/62* (2018.01); *F24F 11/70* (2018.01); *F24F 13/32* (2013.01); *G05D 23/1905* (2013.01); *G05D 23/1932* (2013.01); *F24F 11/52* (2018.01); *F24F 11/56* (2018.01);

(Continued)

(58) Field of Classification Search
CPC ........ F24F 11/0001; F24F 11/62; F24F 11/50; F24F 11/30; F24F 11/70; F24F 13/32; F24F 2140/40; F24F 2110/20; F24F 2120/10; F24F 2110/70; F24F 2110/22; F24F 11/56; F24F 2110/10; F24F 2110/12; F24F 11/52; F24F 2011/0002; G05D 23/1905; B60H 1/00742; B60H 1/00735
USPC ....................................................... 165/237
See application file for complete search history.

(56) References Cited

U.S. PATENT DOCUMENTS 4,257,319 A * 3/1981 Kucharczyk ......... F24F 11/0001
454/256
4,437,608 A * 3/1984 Smith .................. F24F 11/0001
236/13

(Continued)

*Primary Examiner* — Tho V Duong
*Assistant Examiner* — Raheena R Malik
(74) *Attorney, Agent, or Firm* — Baker Botts L.L.P.

(57) ABSTRACT

According to certain embodiments, a controller is operable to instruct a climate control system to operate according to an occupied mode or an unoccupied mode based on a pre-defined schedule. The occupied mode uses pre-defined settings associated with an occupied status, and the unoccupied mode uses pre-defined settings associated with an unoccupied status. The controller is operable to receive an indication that an occupancy sensor detects a space as being occupied. In response to receiving the indication when the pre-defined schedule requires the climate control system to operate in the unoccupied mode, the controller is operable to instruct the climate control system to use the pre-defined settings associated with the occupied status during an override time period.

11 Claims, 13 Drawing Sheets

(51) Int. Cl.
*G05D 23/19* (2006.01)
*F24F 11/62* (2018.01)
*F24F 11/30* (2018.01)
*F24F 11/70* (2018.01)
*F24F 13/32* (2006.01)
*F24F 110/70* (2018.01)
*F24F 140/40* (2018.01)
*F24F 110/20* (2018.01)
*F24F 110/22* (2018.01)
*F24F 11/56* (2018.01)
*F24F 110/10* (2018.01)
*F24F 110/12* (2018.01)
*F24F 120/10* (2018.01)
*F24F 11/52* (2018.01)

(52) U.S. Cl.
CPC ... *F24F 2011/0002* (2013.01); *F24F 2110/10* (2018.01); *F24F 2110/12* (2018.01); *F24F 2110/20* (2018.01); *F24F 2110/22* (2018.01); *F24F 2110/70* (2018.01); *F24F 2120/10* (2018.01); *F24F 2140/40* (2018.01)

(56) References Cited

U.S. PATENT DOCUMENTS

| | | | | |
|---|---|---|---|---|
| 4,784,212 A * | 11/1988 | Brimer | G05D 23/1917 | 165/240 |
| 5,357,170 A * | 10/1994 | Luchaco | H05B 47/105 | 315/159 |
| 5,395,042 A * | 3/1995 | Riley | G05D 23/1917 | 236/46 R |
| 5,462,485 A * | 10/1995 | Kinkead | F24F 11/0001 | 454/256 |
| 5,753,983 A * | 5/1998 | Dickie | G08B 13/19 | 307/125 |
| 6,154,686 A * | 11/2000 | Hefferen | B08B 15/023 | 454/59 |
| 6,349,883 B1 * | 2/2002 | Simmons | F24F 11/30 | 236/46 R |
| 6,536,675 B1 * | 3/2003 | Pesko | F24F 13/24 | 165/238 |
| 7,454,269 B1 * | 11/2008 | Dushane | G05D 23/1902 | 700/276 |
| 7,984,860 B2 * | 7/2011 | Liao | F24F 11/30 | 236/46 R |
| 8,090,477 B1 * | 1/2012 | Steinberg | G05D 23/1905 | 700/278 |
| 8,369,995 B2 * | 2/2013 | Nanami | G05B 19/042 | 165/237 |
| 8,803,696 B1 * | 8/2014 | Dunyan | E05F 15/668 | 340/632 |
| 10,120,397 B1 * | 11/2018 | Zakhor | F24F 11/63 | |
| 2008/0099570 A1 * | 5/2008 | Krebs | F23N 5/203 | 236/46 R |
| 2015/0136378 A1 * | 5/2015 | Maeda | G05D 23/1904 | 165/237 |
| 2015/0300670 A1 * | 10/2015 | Sakamoto | F24F 7/06 | 165/237 |
| 2015/0308706 A1 * | 10/2015 | Bunker | F24D 19/1096 | 700/275 |
| 2015/0316276 A1 * | 11/2015 | Matsugi | F24F 1/0007 | 62/160 |
| 2016/0003493 A1 * | 1/2016 | Katz | F24F 11/30 | 700/275 |

* cited by examiner

TYPICAL THERMOSTAT CONTROL APPLICATION

ONE WAY CONTROL
Y1/Y2/W1/W2 (DISCRETE 24VAC SIGNALS)

CS8500 APPLICATION

2 WAY COMMUNICATION
COM+/COM- (COMMUNICATING COMMANDS BETWEEN TWO POINTS, SETPOINTS ALLOW UNIT TO OPERATE HEATING/COOLING ON ITS OWN)

OPERATING A CLIMATE CONTROL SYSTEM BASED ON OCCUPANCY STATUS

RELATED APPLICATIONS

This application claims priority to and the benefit of U.S. Provisional Patent Application No. 62/409,068, filed Oct. 17, 2016 and entitled "Climate Control System," the contents of which are herein incorporated by reference in their entirety.

TECHNICAL FIELD

This disclosure relates generally to a climate control system.

BACKGROUND

Climate control systems cool and/or heat a space based on certain temperature set points. In certain applications, climate control systems may be automated and/or controlled so that the temperature set points change based on certain conditions. Indoor Air Quality (IAQ) control systems condition and ventilate based on certain humidity and carbon dioxide setpoints. In certain applications, IAQ control systems may be automated and/or controlled so that the relative humidity (and/or CO2) setpoints change based on certain conditions.

SUMMARY OF THE DISCLOSURE

According to certain embodiments, a device is configured for use in a climate control system. The device is operable to determine, based on configuration information, whether thermostat functionality of the device is enabled or disabled and whether sensor functionality of the device is enabled or disabled. The device is further operable to operate according to the configuration information. Thus, according to certain embodiments, the device can be configured as a thermostat, a sensor, or both.

According to certain embodiments, a thermostat is configured for use in a climate control system. The thermostat is operable to use two-way communication for communicating operational information between the thermostat and at least one rooftop unit (RTU) within the climate control system. For example, the two-way communication comprises sending first operational information to the RTU and receiving second operational information from the RTU. The operational information comprising one or more climate control commands, setpoints, configuration information, diagnostics, and/or sensor data. The thermostat is further operable to operate the climate control system based on the operational information communicated between the thermostat and the RTU.

According to certain embodiments, a controller is operable to instruct a climate control system to operate according to an occupied mode or an unoccupied mode based on a pre-defined schedule. The occupied mode uses pre-defined settings associated with an occupied status, and the unoccupied mode uses pre-defined settings associated with an unoccupied status. The controller is operable to receive an indication that an occupancy sensor detects a space as being occupied. In response to receiving the indication when the pre-defined schedule requires the climate control system to operate in the unoccupied mode, the controller is operable to instruct the climate control system to use the pre-defined settings associated with the occupied status during an override time period.

According to one embodiment, a climate control system includes a device that can operate as a temperature sensor, a thermostat, or both. A user can set the operation of the device by interacting with an interface of the device.

According to another embodiment, a climate control system includes multiple devices that can operate as a temperature sensor, a thermostat, or both. Some of these devices are configured to operate as temperature sensors. These temperature sensors can be installed without reconfiguring the resistance/load of each temperature sensor. A user can install multiple temperature sensors by inputting the number of temperature sensors into a central controller and installing the temperature sensors.

According to another embodiment, a climate control system includes a thermostat and a roof top unit. The thermostat and the roof top unit are in two-way communication with each other. The thermostat can communicate temperature set points to the roof top unit. The roof top unit can communicate sensed humidity levels, carbon dioxide levels, etc. to the thermostat.

According to an embodiment, a climate control system includes a thermostat that can detect when it is coupled to multiple roof top units. The thermostat includes an interface that changes the information that is presented depending on whether the thermostat is coupled to one roof top unit or multiple roof top units.

According to another embodiment, a climate control system includes a device that operates as a thermostat and as a carbon dioxide sensor. The carbon dioxide sensor is integrated with the thermostat. For example, the carbon dioxide sensor may be included in the same housing as the thermostat and/or the carbon dioxide sensor may be included on the same printed circuit board as the thermostat.

According to an embodiment, a climate control system operates based on an occupancy of a room and/or a schedule. When an occupancy sensor detects that the room is occupied, the system may operate under an "occupied" temperature set range. When the occupancy sensor detects that the room is unoccupied, the system may operate under an "unoccupied" temperature set range.

Certain embodiments may provide one or more technical advantages. For example, an embodiment allows for greater control over the temperature of a space. As another example, an embodiment allows for a climate control system to provide greater comfort to a user. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 11 of the drawings, like numerals being used for like and corresponding parts of the various drawings.

Climate control systems cool and heat a space based on certain temperature set points. In certain applications, temperature set points may be changed based on whether the space is occupied or unoccupied. As another example, temperature set points may be changed based on an external temperature. In an automated system, the system may determine whether the temperature set point should be changed and if so, change to the set point automatically. Certain embodiments of the climate control systems disclosed herein may include an IAQ control system. The IAQ control system conditions and ventilates based on certain humidity and/or carbon dioxide setpoints. In certain embodiments, the IAQ control system may be automated and/or controlled so that the relative humidity (and/or CO2) setpoints change based on certain conditions.

Figure 1:
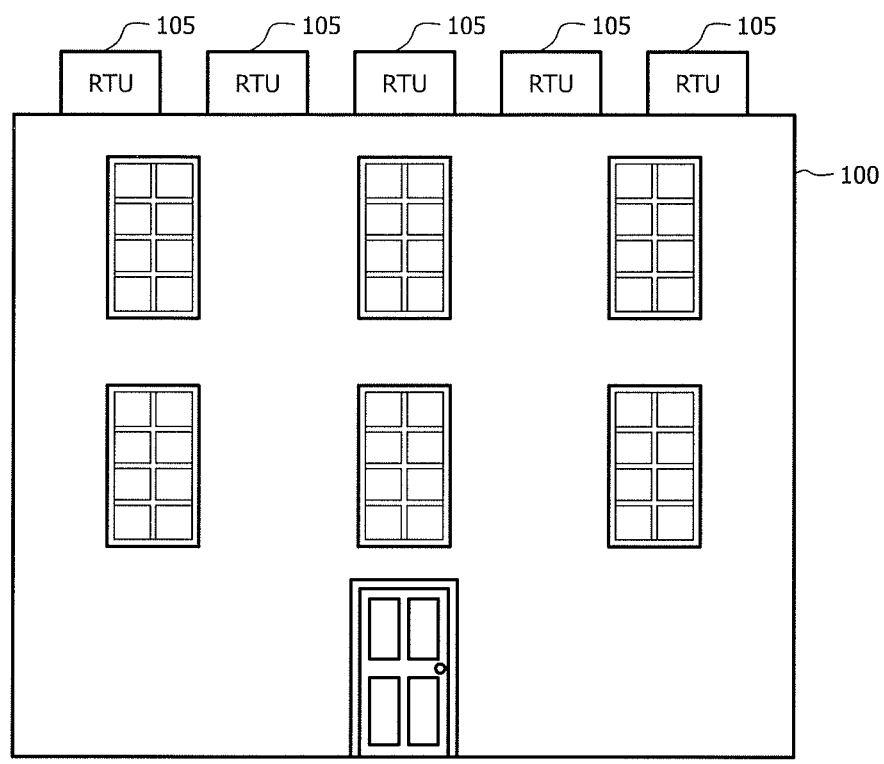
FIG. 1 illustrates an example building with a climate control system.

FIG. 1 illustrates an example building with a climate control system. As illustrated in FIG. 1, a building 100 includes several rooms. Each room may be serviced by a climate control system. Each climate control system operates to cool and/or heat the room. Each climate control system includes a rooftop unit (RTU) 105. Each RTU 105 operates to cool and/or heat the room.

Each RTU 105 and/or climate control system may have temperature set points based on certain criteria. For example, if a room is not occupied, the temperature set point may be set so that the RTU 105 does not operate as frequently. As another example, if a temperature external to building 100 is cold, for example in the winter, the temperature set point may be set so that RTU 105 does not operate as frequently.

This disclosure contemplates a climate control system that includes several improvements over existing climate control systems. These improvements will be described using FIGS. 2 through 11.

Figure 2A:
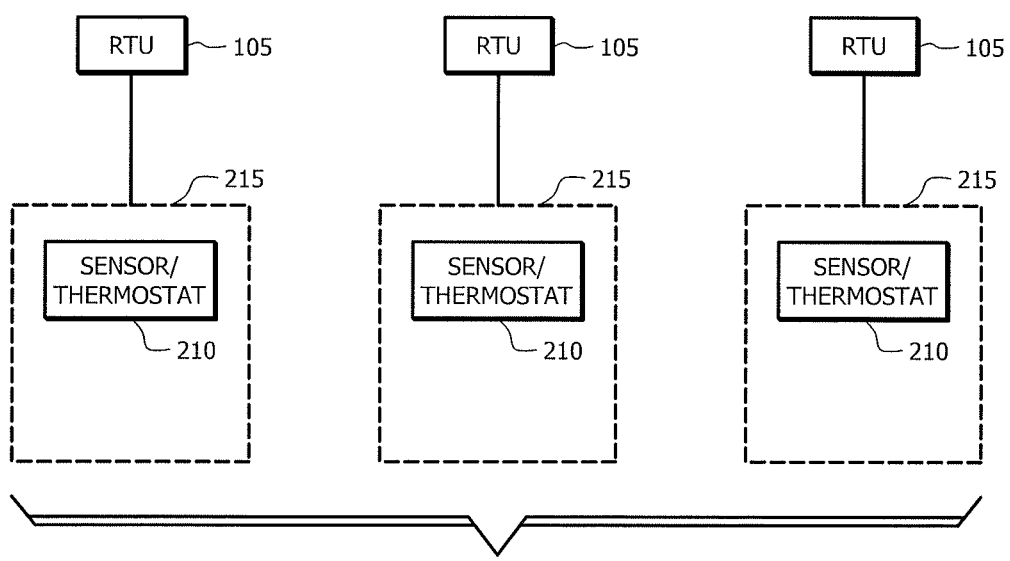
FIGS. 2A-2C illustrate example climate control systems.

FIG. 2A illustrates an example climate control system. As illustrated in FIG. 2, the climate control system includes one or more RTUs 105 and one or more sensors/thermostats 210. In particular embodiments, the climate control system allows for each sensor/thermostat 210 to override temperature set points.

Each sensor/thermostat 210 may be located in a space 215 such as, for example, a room of a building. Each sensor/thermostat 210 may detect various environmental conditions of the space 215 proximate the sensor/thermostat such as, for example, a temperature, a humidity, a carbon dioxide level, etc. Each sensor/thermostat 210 may then report the detected information to an RTU 105. The RTU 105 may then activate and/or deactivate based on the detected information and on the temperature set points set by automation control 110 and/or sensor 210.

Each sensor/thermostat 210 includes an adjustment mechanism through which a user can adjust a temperature set point for the particular RTU 105. If the user changes the temperature set point, then RTU 105 may override the temperature set point with the temperature set point set by the user using sensor/thermostat 210. RTU 105 may then operate based on the user's desired temperature set point for a period of time. In this manner, the climate control system improves the comfort of the user.

In some embodiments, the adjustment mechanism allows a user to change the occupancy status of a space 215 (e.g., from unoccupied to occupied). If the user adjusts the occupancy status to occupied using the adjustment mechanism, then RTU 105 operates based on temperature set points for an occupied space 215 rather than an unoccupied space 215. Effectively, the user uses sensor/thermostat 210 to override the occupancy status (and the temperature set points with some limitations).

In particular embodiments, the climate control system includes one or more dehumidifiers. Each sensor/thermostat 210 may detect a humidity of the space 215 proximate the sensor/thermostat 210. Based on the detected humidity, the climate control system may activate and/or deactivate the one or more dehumidifiers to adjust the humidity of the space 215. In this manner, the comfort of the space 215 and the user may be improved. Similar to temperature, certain embodiments provide the user with the ability to adjust the humidity setpoint, for example, by using a graphical user interface to configure the humidity setpoint.

In certain embodiments, the climate control system includes one or more dampers that control intake of air external to a building such as, for example, building 100. Each sensor/thermostat 210 may also detect a carbon dioxide level of the space 215 proximate the sensor. Based on the detected carbon dioxide level of the space 215, the climate control system may adjust a position of the dampers to allow more or less external air to flow into the space 215. In this manner, climate control system 200 may adjust the carbon dioxide level of the space 215 thereby improving the comfort of the space 215 and/or the user. In certain embodiments, the carbon dioxide settings are setup during commissioning of the climate control system.

In certain embodiments, the one or more RTUs 105 and the one or more sensors/thermostats 210 are not located in the same spaces. For example, the one or more RTUs 105 may be located on the rooftop of a building. Each sensor/thermostat 210 may be located in a different room of the building.

Figure 2B:
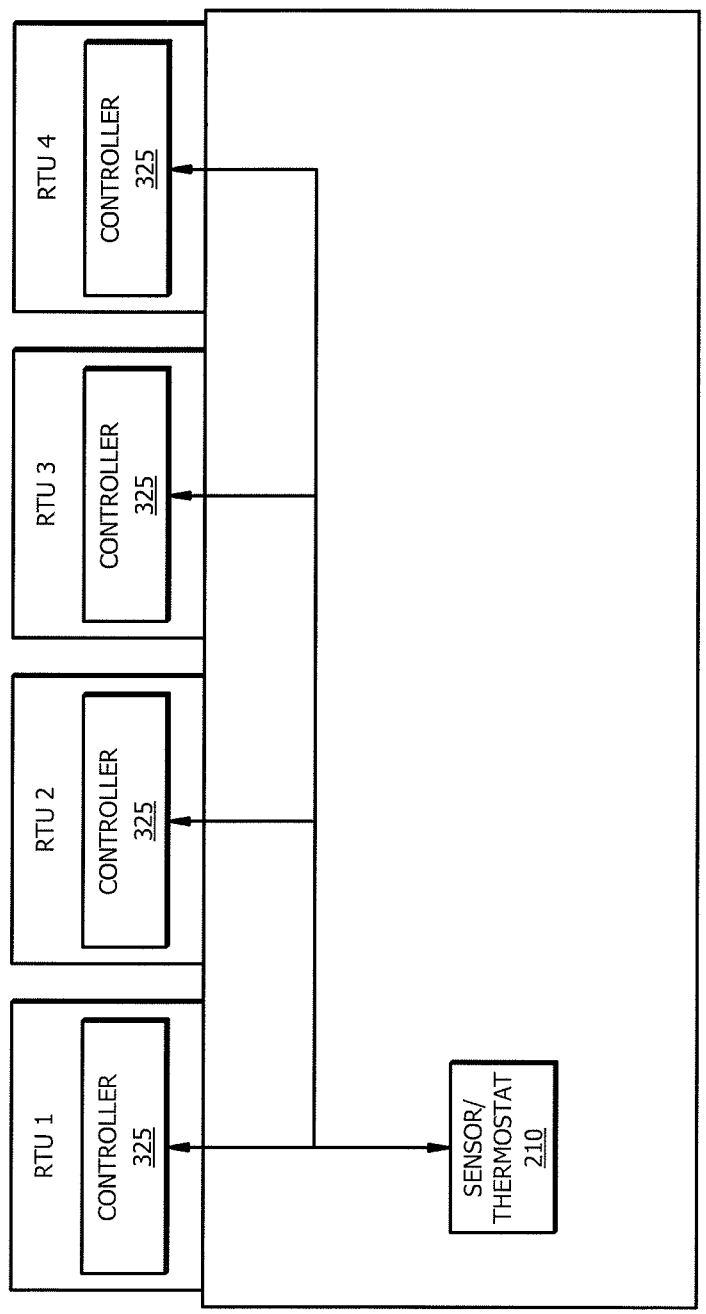
Figure 2C:
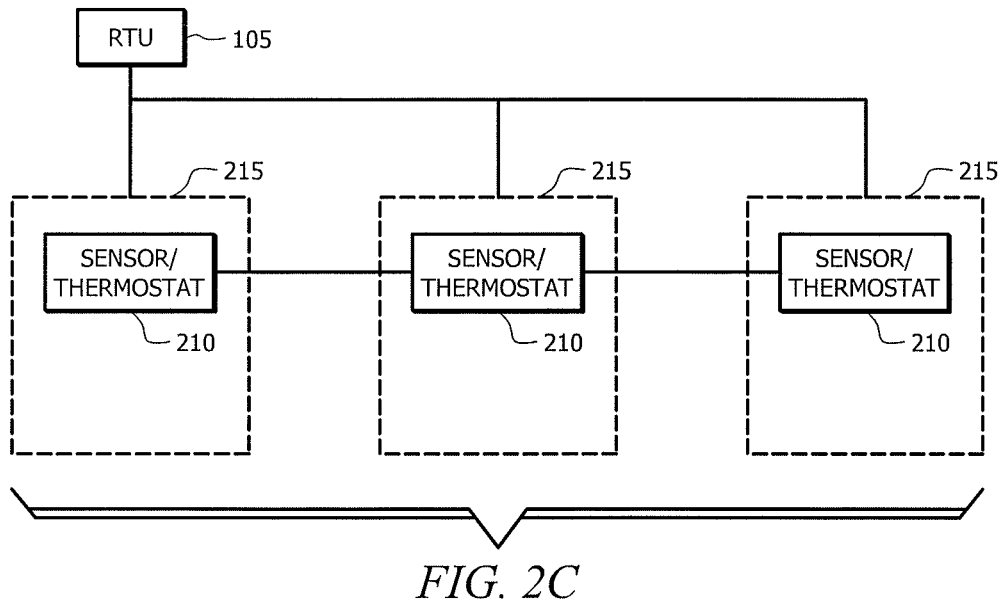

In some embodiments, sensor/thermostat 210 communicates with multiple RTUs 105. For example, as illustrated in FIG. 2B, a large space (e.g., a gym or auditorium) may use multiple RTUs to control the comfort of those spaces. However, only one sensor/thermostat 210 may be used to control the multiple RTUs 105. Each RTU 105 may include a controller 325 that communicates with sensor/thermostat 210.

In some embodiments, one RTU 105 may control the comfort of multiple spaces 215. For example, an RTU 105 may control the climate in several small rooms (e.g., bedrooms, classrooms, etc.). Each space 215 may have its own sensor/thermostat 210. One sensor/thermostat 210 in one room may control the operation of RTU 105 while the other sensors/thermostats 210 detect the temperature and/or climate of the other spaces 215. The detected temperature, humidities, etc. across the sensors/thermostats 210 may be averaged to determine whether RTU 105 should activate or deactivate.

This disclosure contemplates sensor/thermostat 210 operating as either a sensor, a thermostat, or both. The operation of a sensor/thermostat 210 may be changed based on user input. For example, a user can select, by interacting with an interface of sensor/thermostat 210, whether sensor/thermostat 210 should operate as a sensor, thermostat, or both. In the illustrated example of FIG. 2C, one of the sensors/thermostats 210 may be set to operate as a sensor and a thermostat while the other two sensors/thermostats 210 are set to operate as sensors only. In some instances, this disclosure uses the words thermostat, sensor, and thermostat unit to refer to this sensor/thermostat 210.

Figure 2D:
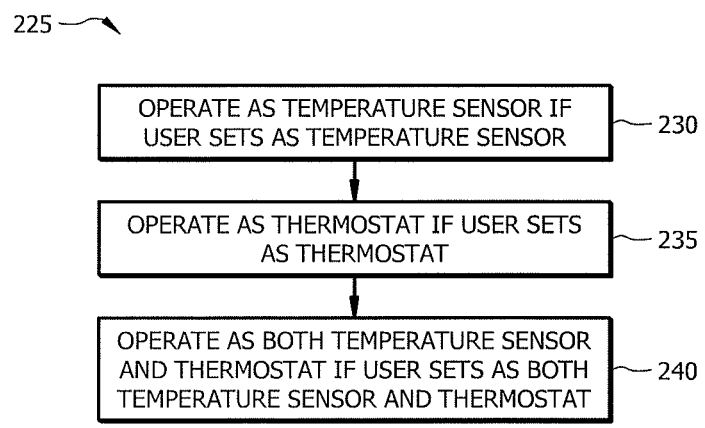
FIGS. 2D-2E are flowcharts illustrating methods of operating example climate control systems.

FIG. 2D is a flowchart illustrating a method 225 of operating example climate control systems. In particular embodiments, sensor/thermostat 210 performs method 225. In step 230, sensor/thermostat 210 operates as a temperature sensor if a user sets sensor/thermostat 210 to operate as a temperature sensor. In step 235, sensor/thermostat 210 operates as a thermostat if the user sets sensor/thermostat 210 to operate as a thermostat. In step 240, sensor/thermostat 210 operates as both a temperature sensor and a thermostat if the user sets sensor/thermostat 210 to operate as both a temperature sensor and a thermostat.

In certain embodiments, sensor/thermostat 210 can be configured to operate as a standalone temperature sensing and control device with internal setpoints, or to operate with a supervisory network controller's setpoints. Additionally, in certain embodiments, a user may change the configuration (e.g., from thermostat to sensor functionality, or vice-versa) by interacting with a graphical user interface of sensor/thermostat 210.

In certain embodiments, sensor/thermostat 210 may detect the number of RTUs 105 that sensor/thermostat 210 controls and whether the RTUs 105 are operating as zoned or unzoned (e.g., whether each RTU is used to control the climate in different spaces). In the illustrated example of FIG. 2B, sensor/thermostat 210 may detect that there are four RTUs 105 and that they are operating unzoned. An interface of sensor/thermostat 210 may change depending on whether multiple RTUs 105 are detected and whether they are operating zoned or unzoned. For example, the interface may present information for multiple RTUs if multiple RTUs are detected. As another example, the interface may present the detected temperatures for multiple zones if the RTUs are zoned.

Figure 2E:
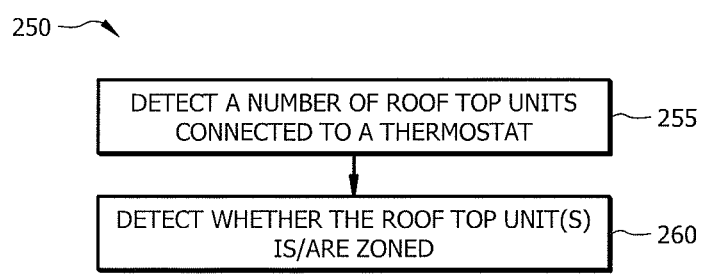

FIG. 2E is a flowchart illustrating a method 250 of operating an example climate control system. In particular embodiments, sensor/thermostat 210 performs method 250. In step 255, sensor/thermostat 210 detects a number of connected RTUs. In step 260, sensor/thermostat 210 detects whether the RTUs are zoned or unzoned. In certain embodiments, sensor/thermostat 210 provides a consistent user interface regardless of whether it controls a single RTU or multiple RTUs or whether the RTUs are zoned or unzoned. In certain embodiments, a single sensor/thermostat 210 may control multiple RTUs through adjustment of dampers as well as heating/cooling votes per each individual RTU.

Figure 3A:
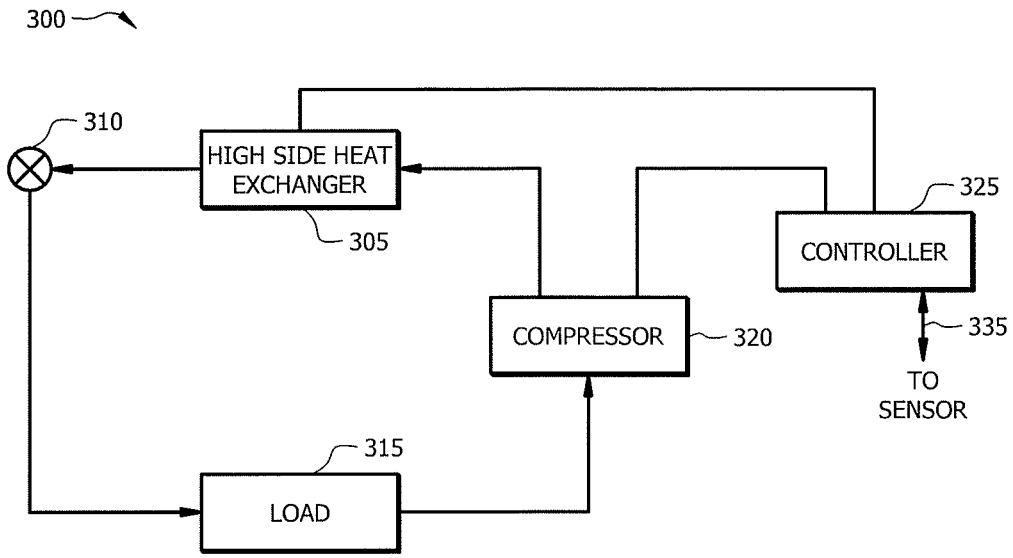
FIG. 3A illustrates an example cooling system.

FIG. 3A illustrates an example cooling system 300. Cooling system 300 may form a portion of the climate control system and/or RTU 105. As illustrated in FIG. 3A, cooling system 300 includes a high side heat exchanger 305, an expansion valve 310, a load 315, a compressor 320, and a controller 325. In particular embodiments, controller 325 may allow for a temperature set point to be overridden by a temperature set point set by an individual user.

This disclosure contemplates one or more components of cooling system 300 forming an RTU 105. For example, an RTU 105 may include high side heat exchanger 305, expansion valve 310, load 315, compressor 320, and/or controller 325. In some embodiments, controller 325 may be coupled to an external housing of RTU 105. This disclosure contemplates cooling system 300 and/or the climate control system including additional components that are not illustrated, such as for example, a flash tank and/or additional compressors and expansion valves.

High side heat exchanger 305 may remove heat from the refrigerant. When heat is removed from the refrigerant, the refrigerant is cooled. This disclosure contemplates high side heat exchanger 305 being operated as a condenser and/or a gas cooler. When operating as a condenser, high side heat exchanger 305 cools the refrigerant such that the state of the refrigerant changes from a gas to a liquid. When operating as a gas cooler, high side heat exchanger 305 cools the refrigerant but the refrigerant remains a gas. In certain configurations, high side heat exchanger 305 is positioned such that heat removed from the refrigerant may be discharged into the air. For example, high side heat exchanger 305 may be positioned on a rooftop so that heat removed from the refrigerant may be discharged into the air. As another example, high side heat exchanger 305 may be positioned external to a building and/or on the side of a building.

Expansion valve 310 reduces the pressure and therefore the temperature of the refrigerant. Expansion valve 310 reduces pressure from the refrigerant flowing into the expansion valve 310. The temperature of the refrigerant may then drop as pressure is reduced. As a result, warm or hot refrigerant entering expansion valve 310 may be cooler when leaving expansion valve 310. The refrigerant leaving expansion valve 310 is fed to load 315.

Refrigerant may flow from expansion valve 310 to load 315. When the refrigerant reaches load 315, the refrigerant removes heat from the air around load 315. As a result, the air is cooled. The cooled air may then be circulated such as, for example, by a fan, to cool a space, such as a room of a building. As refrigerant passes through load 315, the refrigerant may change from a liquid state to a gaseous state.

Refrigerant may flow from load 315 to compressor 320. This disclosure contemplates system 100 including any number of compressors 320. Compressor 320 may be configured to increase the pressure of the refrigerant. As a result, the heat in the refrigerant may become concentrated and the refrigerant may become a high pressure gas. Compressor 320 may then send the compressed refrigerant to high side heat exchanger 305.

Controller 325 may activate and/or deactivate components of cooling system 300. For example, controller 325 may activate high side heat exchanger 305 and/or compressor 320 based on temperature set points. In one example, controller 325 may receive a temperature set point. Then controller 325 may receive a detected temperature of a space from sensor 210 over line 335. Controller 325 compares the detected temperature and the temperature set point to determine whether high side heat exchanger 305 and/or compressor 320 should be activated and/or deactivated. For example, if the detected temperature is lower than the temperature set point, then controller 325 may deactivate high side heat exchanger 305 and/or compressor 320. If the detected temperature is higher than the temperature set point, then controller 325 may activate high side heat exchanger 305 and/or compressor 320 to cool a space 215.

Controller 325 may allow a user to override the temperature set points. For example, the user may operate an adjustment mechanism of a thermostat/sensor 210 in a space 215 to provide a different temperature set point. When controller 325 determines that a new temperature set point has been provided by the user, controller 325 may operate cooling system 300 based on the user's temperature set point. For example, if the detected temperature of a space is 75 degrees Fahrenheit and the temperature set point is 80 degrees Fahrenheit, then controller 325 may not normally activate high side heat exchanger 305 and/or compressor 320. However, if a user provides a new temperature set point of 73 degrees Fahrenheit, then controller 325 may allow the user's temperature set point to override. As a result, controller 325 may activate high side heat exchanger 305 and/or compressor 320 based on the user's temperature set point to cool a space 215.

In particular embodiments, controller 325 may operate cooling system 300 based on a user's temperature set point for a period of time. For example, controller 325 may operate using a user's temperature set point for a set period of time such as, for example, 15 minutes. When controller 325 determines that the user's temperature set point should override and that the user's temperature set point is lower than the detected temperature of the space, controller 325 may activate high side heat exchanger 305 and/or compressor 320 and start running a timer for 15 minutes. When the timer expires, controller 325 may revert back to the original temperature set point and deactivate high side heat exchanger 305 and/or compressor 320. In this manner, a user may override the temperature set point for a period of time. As a result, controller 325 prevents a user's temperature set point from overriding for an undesirable period of time.

Figure 3B:
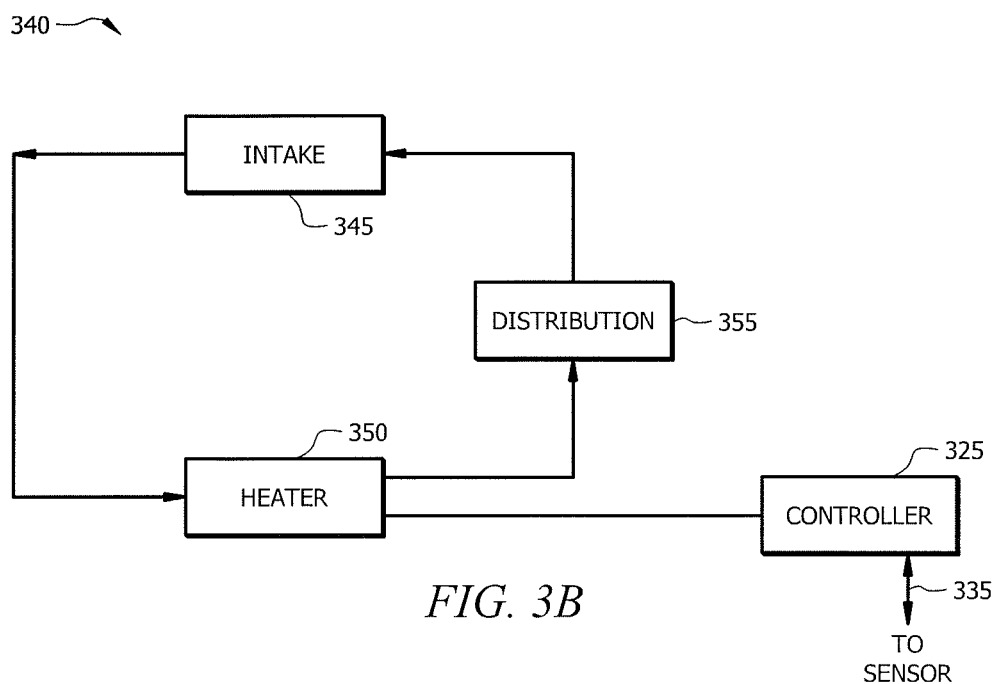
FIG. 3B illustrates an example heating system.

FIG. 3B illustrates an example heating system 340. Heating system 340 may form a portion of the climate control system and/or RTU 105. As illustrated in FIG. 3B, heating system 340 includes an intake 345, a heater 350, a distribution 355, and controller 325. In particular embodiments, controller 325 may allow for a temperature set point to be overridden by a temperature set point set by an individual user.

This disclosure contemplates one or more components of heating system 340 forming an RTU 105. For example, an RTU 105 may include intake 345, heater 350, distribution 355, and/or controller 325. In some embodiments, controller 325 may be coupled to an external housing of RTU 105. This disclosure contemplates heating system 340 and/or the climate control system including additional components that are not illustrated.

Intake 345 may receive and/or collect colder air internal and/or external to building 100. Intake 345 then circulates this colder air to heater 350 to be heated. This disclosure contemplates intake 345 including any appropriate components such as for example one or more fans, one or more vents, and one or more ventilation shafts.

Heater 350 receives the colder air from intake 345 and heats that air to produce a warmer air. Heater 350 then circulates that warmer air to distribution 355 to heat a space 215. This disclosure contemplates heater 350 including any appropriate components such as for example a furnace, a boiler, and/or a heat pump. This disclosure further contemplates heater 350 using gas or electric supplies.

Distribution 355 receives the warmer air from heater 350 and circulates that warmer air throughout a space 215 to heat the space 215. As that warmer air heats the space 215, the air cools and is taken back to heater 350 by intake 345. This disclosure contemplates distribution 355 including any appropriate components such as for example one or more fans, one or more vents, and one or more ventilation shafts.

Controller 325 may activate and/or deactivate components of heating system 340. For example, controller 325 may activate heater 350 and/or one or more fans. In one example, controller 325 may receive a temperature set point. Then controller 325 may receive a detected temperature of a space from sensor 210 over line 335. Controller 325 compares the detected temperature and the temperature set point to determine whether heating system 340 should be activated and/or deactivated. For example, if the detected temperature is higher than the temperature set point, then controller 325 may deactivate heating system 340. If the detected temperature is lower than the temperature set point, then controller 325 may activate heating system 340 to heat a space 215.

Controller 325 may allow a user to override the temperature set point. For example, the user may operate, an adjustment mechanism of a thermostat/sensor 210 in a space 215 to provide a different temperature set point and/or change the occupancy status of space 215. When controller 325 determines that a new temperature set point should be set, controller 325 may operate heating system 340 based on the user's temperature set point rather than the original temperature set point. For example, if the detected temperature of a space is 75 degrees Fahrenheit and the temperature set point provided by automation controller 205 is 70 degrees Fahrenheit, then controller 325 may not normally activate heating system 340. However, if a user provides a new temperature set point of 78 degrees Fahrenheit, then controller 325 may allow the user's temperature set point to override the temperature set point provided by automation controller 205. As a result, controller 325 may activate heating system 340 based on the user's temperature set point to heat a space 215.

In particular embodiments, controller 325 may operate heating system 340 based on a user's temperature set point for a period of time. For example, automation control 110 may be programmed to allow controller 325 to operate using a user's temperature set point for a set period of time such as, for example, 15 minutes. When controller 325 determines that the user's temperature set point should override and that the user's temperature set point is higher than the detected temperature of the space, controller 325 may activate heating system 340 and start running a timer for 15 minutes. When the timer expires, controller 325 may revert back to the original temperature set point and deactivate heating system 340. In this manner, a user may override the original temperature set point for a period of time. As a result, controller 325 prevents a user's temperature set point from overriding for an undesirable period of time.

This disclosure contemplates controller 325 including any combination of hardware (e.g., a processor and a memory). A processor of controller 325 may be any electronic circuitry, including, but not limited to microprocessors, application specific integrated circuits (ASIC), application specific instruction set processor (ASIP), and/or state machines, that communicatively couples to a memory of controller 325 and controls the operation of the climate control system. The processor may be 8-bit, 16-bit, 32-bit, 64-bit or of any other suitable architecture. The processor may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor may include other hardware and software that operates to control and process information. The processor executes software stored on memory to perform any of the functions described herein. The processor controls the operation and administration of the climate control system by processing information. The processor may be a programmable logic device, a microcontroller, a microprocessor, any suitable processing device, or any suitable combination of the preceding. The processor is not limited to a single processing device and may encompass multiple processing devices.

The memory may store, either permanently or temporarily, data, operational software, or other information for the processor. The memory may include any one or a combination of volatile or non-volatile local or remote devices suitable for storing information. For example, the memory may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory, a disk, a CD, or a flash drive. In particular embodiments, the software may include an application executable by the processor to perform one or more of the functions described herein.

Figure 4A:
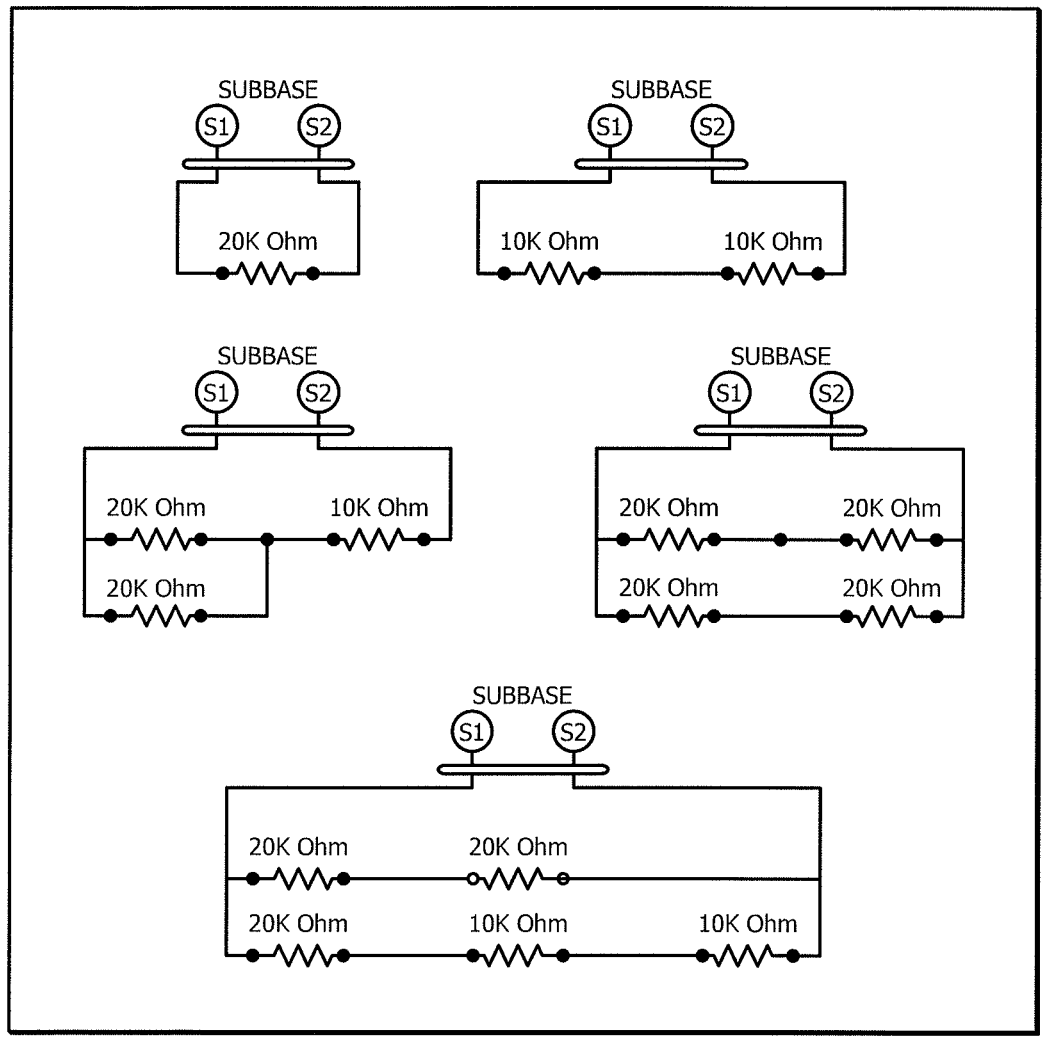
FIGS. 4A-4B illustrate example temperature sensors.

In some applications, such as certain applications where a wall-mounted sensor/thermostat is used to sense space temperature, one or more external sensors may be installed in order to average temperatures. FIG. 4A illustrates example temperature sensors. Specifically, FIG. 4A illustrates four different configurations of example temperature sensors. As shown in FIG. 4A, each configuration includes one or more temperature sensors that each have an electrical resistance. In certain embodiments, the electrical resistance of a temperature sensor is provided and/or supplied by a resistor installed in the temperature sensor. The resistance of a temperature sensor can be changed by changing and/or replacing that electrical resistor. However, the equivalent resistances of the temperature sensors in each configuration must be a certain value (e.g., 20 kOhms). When a temperature sensor is added or removed, the resistors in the remaining temperature sensors should be adjusted to maintain the equivalent resistance. For example, an installer would typically have to configure these sensors in different variations and orientations to achieve the desired resistance corresponding to the desired number of sensors. As a result, adding and/or removing temperature sensors presents a configuration difficulty for administrators of the climate control system.

Figure 4B:
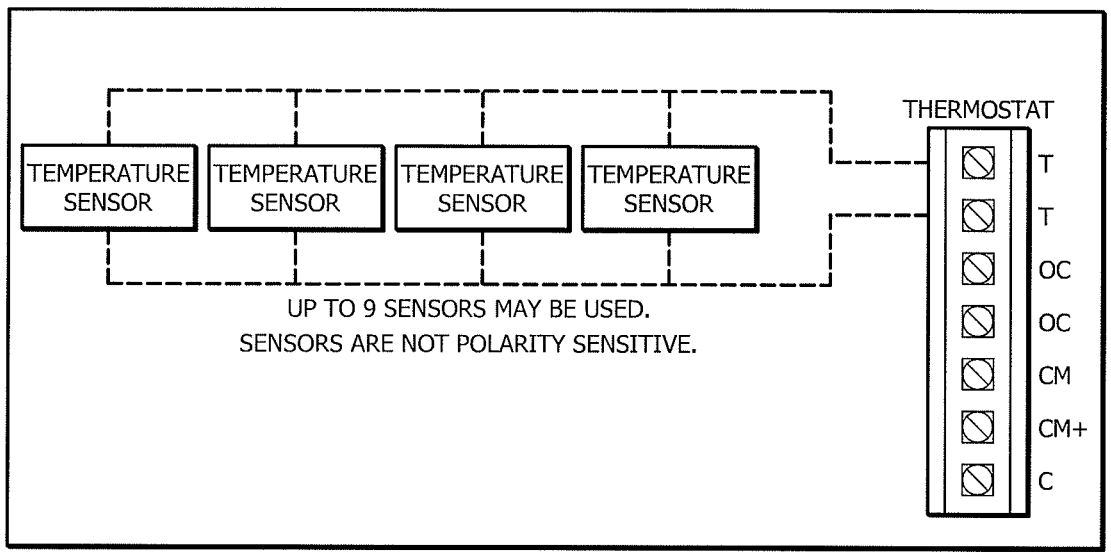

FIG. 4B illustrates example temperature sensors. This disclosure contemplates a thermostat and/or a controller determining the number of temperature sensors connected in the climate control system and adjusting automatically when temperature sensors are removed and/or added. For example, a user may input to the thermostat or controller the number of temperature sensors in the climate control system. The thermostat and/or controller may then adjust for that number of temperature sensors. The user may add and/or remove temperature sensors to/from the system. In certain embodiments, there exists a maximum number of temperature sensors that the thermostat and/or controller can accommodate (e.g., nine temperature sensors). In some embodiments, the temperature sensors are not polarity sensitive. In this manner, the thermostat and/or controller addresses the difficulties faced when adding and/or removing temperature sensors (e.g., changing resistors in remaining temperature sensors). For example, in certain embodiments, the installer does not need to change orientation and simply needs to enter the number of sensors required and install them the same way.

Figure 4C:
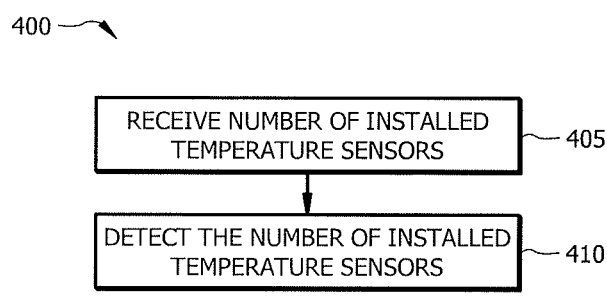
FIG. 4C is a flowchart illustrating a method of operating example climate control systems.

FIG. 4C is a flowchart illustrating a method 400 of operating example climate control systems. In particular embodiments, a thermostat and/or controller performs method 400. In step 405, the thermostat and/or controller receives the number of installed temperature sensors. In step 410, the thermostat and/or controller detects the number of installed temperature sensors.

Figure 5A:
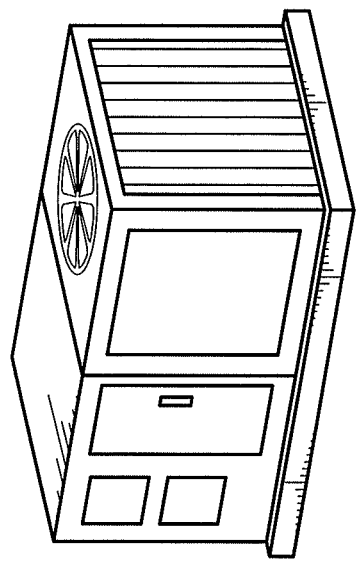
FIGS. 5A-5B illustrate example climate control systems.
Figure 5A:
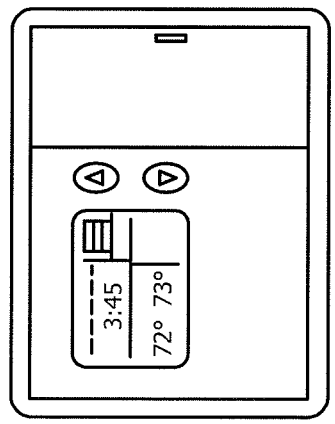

FIG. 5A illustrates an example climate control system. As shown in FIG. 5A, a thermostat may communicate information to an RTU. This one-way communication may instruct the RTU to activate and/or deactivate. In some embodiments, this information may be communicated over a bundle of wires (e.g., Y1, Y2, W1, and W2). The signals may be discrete 24V AC signals. However, one-way communication does not allow for the RTU to communicate information back to the thermostat. As a result, The RTU will be limited to the capabilities of the thermostat, for example, in terms of the number of heating/cooling stages and blower speeds that can be operated by the thermostat.

Figure 5B:
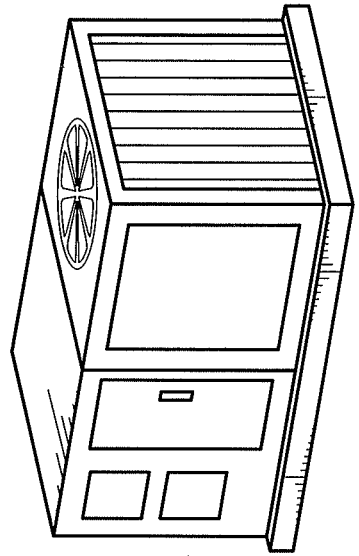
Figure 5B:
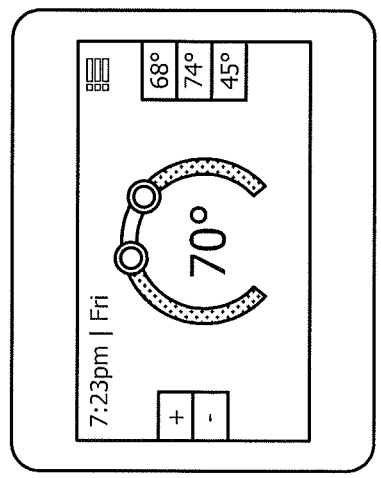

FIG. 5B illustrates an example climate control system. As shown in FIG. 5B, a thermostat may communicate information to an RTU, and the RTU may communicate information back to the thermostat. This two-way communication may instruct the RTU to activate and/or deactivate and it may also allow for the thermostat to adjust based on information detected at the RTU. For example, a user may set temperature set points at the RTU and the thermostat may update its temperature set points based on the user's set points. As another example, the RTU may have sensors (e.g., carbon dioxide sensors, humidity sensors, etc.) that communicate detected information to the thermostat. The thermostat may then determine whether the RTU should activate or deactivate.

Two-way communication between the thermostat and the RTU may allow for more robust operation over a one-way communication system. For example, two-way communication allows the RTU to operate to its maximum capabilities including diagnostics, maximized heating/cooling stages, and full modulating operation. As a further example, in certain embodiments, the RTU can operate heating and/or cooling on its own based on commands and/or setpoints communicated between the thermostat and the RTU. Similarly, in certain embodiments, the RTU can operate dehumidification on its own based on commands and/or setpoints communicated between the thermostat and the RTU. In an embodiment, a user configures temperature and humidity setpoints using a graphical user interface of the thermostat, the thermostat provides the user-configured temperature and humidity setpoints to the RTU, and the RTU operates on its own based on the user-configured temperature and humidity setpoints that it received from the thermostat.

Figure 5C:
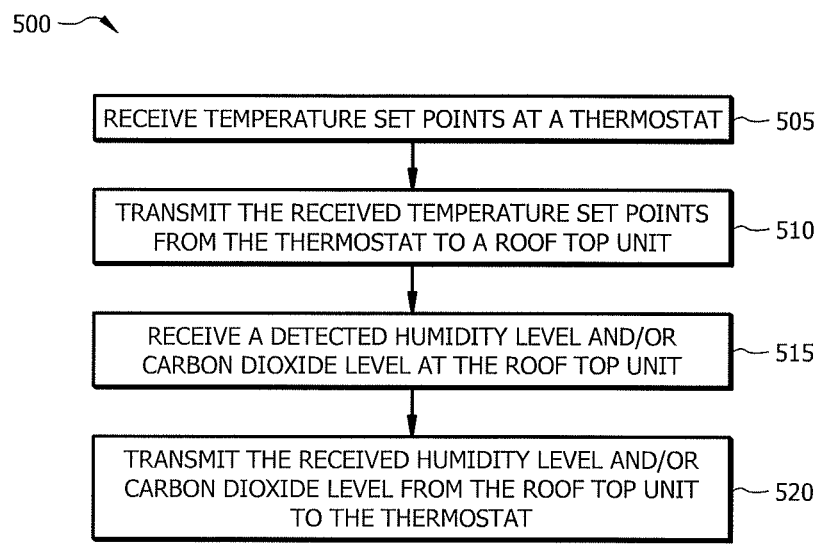
FIG. 5C is a flowchart illustrating a method of operating example climate control systems.

FIG. 5C is a flowchart illustrating a method 500 of operating example climate control systems. In particular embodiments, a thermostat and/or an RTU perform method 500. In step 505, the thermostat receives a temperature set point. In step 510, the thermostat communicates the received temperature set point to the RTU. In step 515, the RTU receives a detected humidity level and/or carbon dioxide level. In step 520, the RTU transmits the received humidity level and/or carbon dioxide level to the thermostat.

Figure 6:
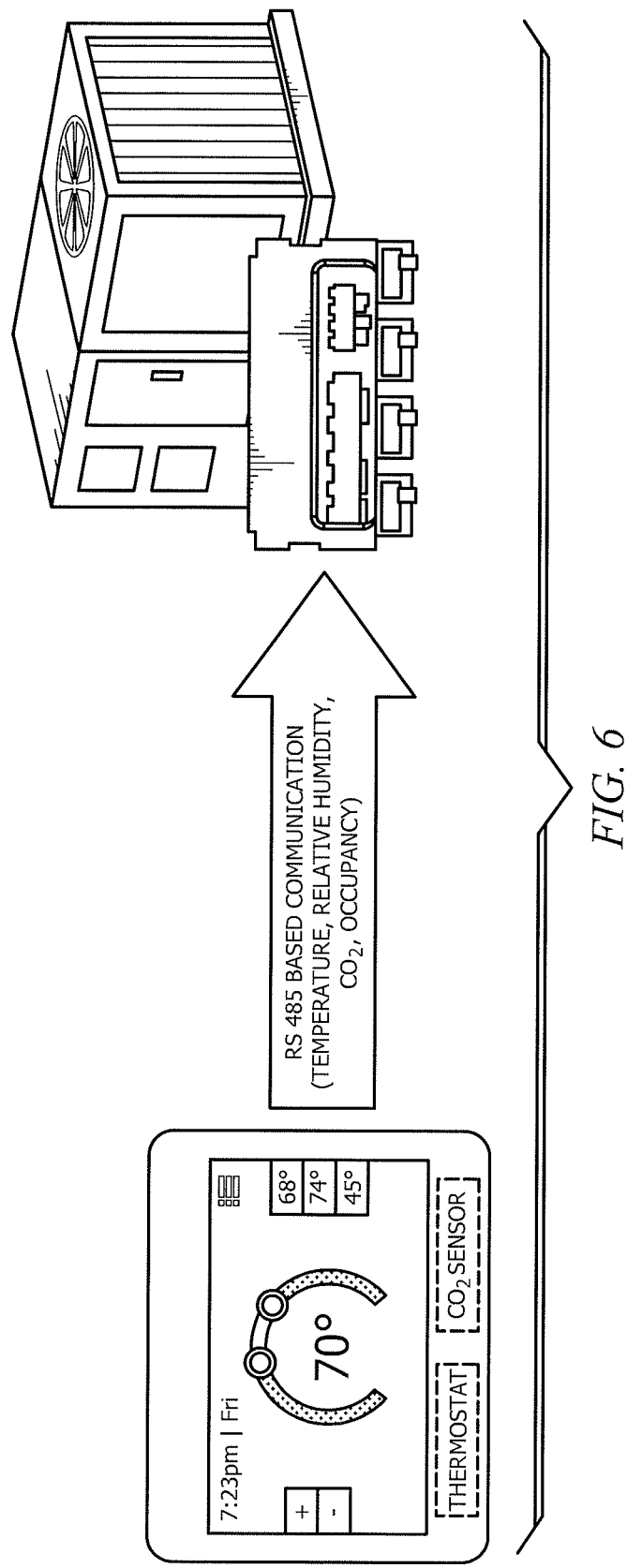
FIG. 6 illustrates an example climate control system.

FIG. 6 illustrates an example climate control system. As shown in FIG. 6, a thermostat may include an integrated carbon dioxide sensor. The carbon dioxide sensor may be included in the same housing as the thermostat and/or may be integrated on the same circuit board as the thermostat. By integrating the carbon dioxide sensor with the thermostat, the thermostat unit is able to detect carbon dioxide levels and communicate those detected levels to the RTU. The thermostat unit is also able to instruct the RTU to open and/or close dampers based on detected carbon dioxide levels. Additionally, in certain embodiments, the thermostat is configured to display information related to carbon dioxide to the user via a graphical user interface. As an example, the thermostat may display a detected amount of carbon dioxide (e.g., in parts per million). As another example, the thermostat may display carbon dioxide setpoints used in controlling ventilation based on the detected carbon dioxide level. In certain embodiments, the graphical user interface may provide a unified view into the operation of both temperature and carbon dioxide controls.

Figure 7:
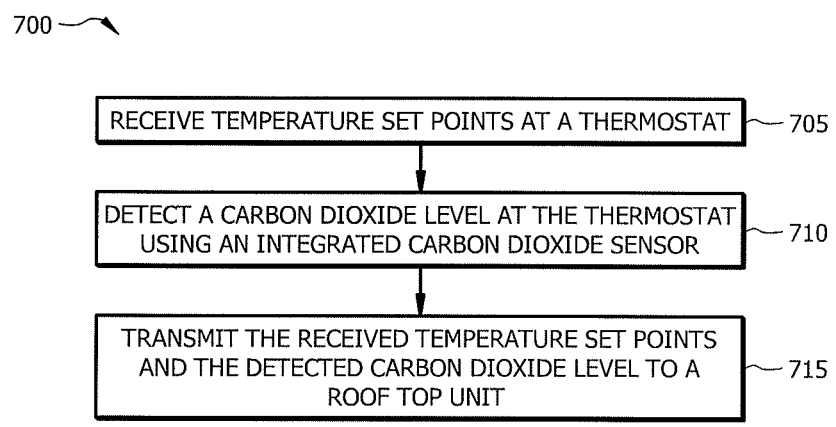
FIGS. 7 and 8 are flowcharts illustrating methods of operating example climate control systems.

FIG. 7 is a flowchart illustrating a method 700 of operating example climate control systems. In particular embodiments, a thermostat unit performs method 700. In step 705, the thermostat unit receives a temperature set point at a thermostat of the thermostat unit. In step 710, the thermostat unit detects a carbon dioxide level using an integrated carbon dioxide sensor of the thermostat unit. In step 715, the thermostat unit transmits the received temperature set point and the detected carbon dioxide level to an RTU. The RTU may open and/or close dampers based on the detected carbon dioxide level. For example, RTU may open dampers to increase fresh air ventilation if the carbon dioxide level in the conditioned space exceeds a threshold. The RTU may close dampers to decrease fresh air ventilation if the carbon dioxide level in the conditioned space is below a threshold. In certain embodiments, the carbon dioxide level may be an indicator of occupancy of the conditioned space (e.g., an increase in carbon dioxide may be interpreted as a change from an unoccupied state to an occupied state, or as an increase in the number of occupants), and the occupancy level may be indicative of the amount of ventilation required.

In certain embodiments, a climate control system may operate based on schedules and/or occupancy status of a space. For example, a system may operate with different temperature set points when a space is occupied rather than when it is unoccupied. In this manner, the system saves energy by not maintaining the comfort/climate of a space when it is unoccupied. In some embodiments, the occupancy status of a space can be scheduled into the system. For example, a schedule can be set for when the system will operate under occupied status and when it will operate under unoccupied status. The system may include an occupancy sensor in the space that detects when the space is occupied.

The system may operate based on the occupancy sensor and the schedule. For example, if a schedule indicates that the system should be operating in occupied status and the space is occupied, then the thermostat operates in occupied status until the schedule expires or until the space is unoccupied. If the space is unoccupied, then the thermostat operates in unoccupied status. As another example, if a schedule indicates that the system should be operating in unoccupied status and the space is occupied, then the occupancy sensor goes to occupied (e.g., using its L Connection or iCON occupied back up set points). If the space is unoccupied, then the occupancy sensor goes unoccupied (e.g., using its L Connection or iCON unoccupied back up set points).

Figure 8:
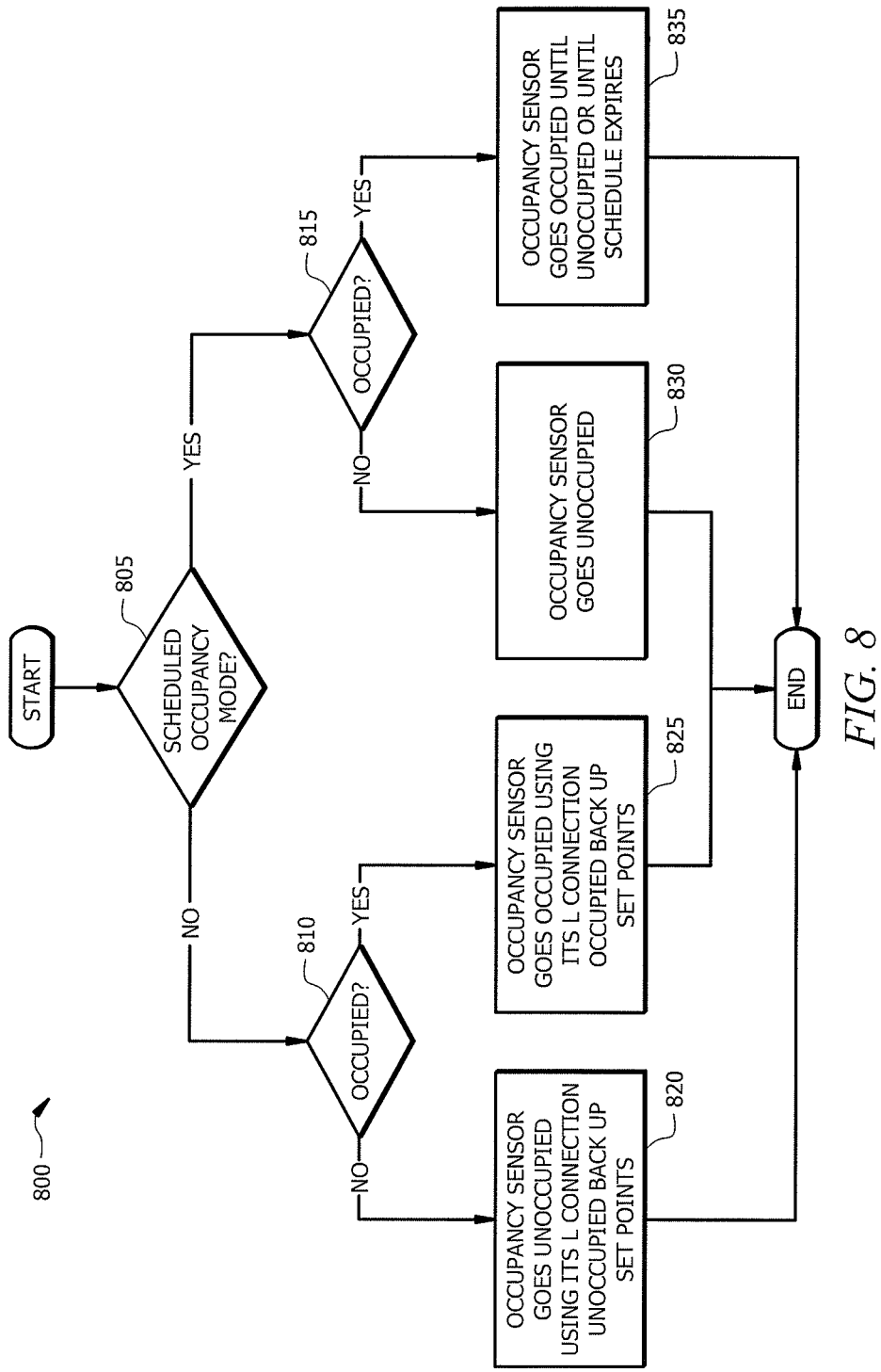

FIG. 8 is a flowchart illustrating a method 800 of operating example climate control systems. In particular embodiments, a thermostat and/or an occupancy sensor performs method 800. In step 805, the thermostat determines whether a schedule indicates that it should operate in occupied or unoccupied mode. If the schedule indicates that it should be operating in occupied mode, then the thermostat will determine whether the occupancy sensor indicates the space is occupied or not in step 815. If the space is occupied, then the occupancy sensor will go to occupied until the schedule expires or until the space is unoccupied in step 835. If the space is unoccupied, then the occupancy sensor goes unoccupied in step 830.

If the schedule indicates that it should be operating in unoccupied mode, then the thermostat will determine whether the occupancy sensor indicates the space is occupied or not in step 810. If the space is occupied, then the occupancy sensor goes occupied (e.g., using its L Connection or iCON occupied back up set points) in step 825. If the space is unoccupied, then the occupancy sensor goes unoccupied (e.g., using its L Connection or iCON unoccupied back up set points).

An advantage of certain embodiments is that occupancy state can be determined based on actual occupancy of the conditioned space rather than based on a pre-defined occupied time period within a schedule (such as a schedule that considers the space occupied during pre-defined business hours and unoccupied after business hours, regardless of the actual occupancy). Any suitable occupancy sensor may be used to determine actual occupancy. As an example, an occupancy sensor may detect an activity, such as an occupant entering commands into a thermostat, an occupant interacting with other equipment that is in communication with the climate control system (e.g., the climate control system receives a notification if the occupant turns on lights or triggers a motion detector within the conditioned space), or a sensor detecting that the carbon dioxide level within the conditioned space has exceeded a threshold.

The occupancy sensor can be used either when the climate control system is in scheduled mode or when it is not in scheduled mode. For example, in certain embodiments, if the climate control system is in scheduled mode and the schedule indicates that the space is unoccupied, the occupancy sensor can override the unoccupied schedule and cause the system to use settings associated with an occupied status during an override time period (e.g., a pre-defined time period, such as 15 minutes, 30 minutes, 45 minutes, 60 minutes, or N minutes, or a time period corresponding to as long as the occupancy sensor detects occupancy). After the override time period, the system resumes using the scheduled settings. In certain embodiments, if the climate control system is in scheduled mode and the schedule indicates that the space is occupied, the occupancy sensor has no effect because the climate control system is already operating according to settings associated with an occupied status.

With respect to embodiments for which the climate control system is not configured in a scheduled mode, the climate control system may use settings associated with an occupied status during the times when the occupancy sensor detects occupancy, and the climate control system may use settings associated with an unoccupied status during the times that the occupancy sensor does not detect occupancy.

The logic for determining whether to configure the climate control system according to occupied or unoccupied settings may be performed by any suitable controller, such as a thermostat (e.g., sensor/thermostat 210) or other controller (e.g., controller 325) of the climate control system.

Figure 9:
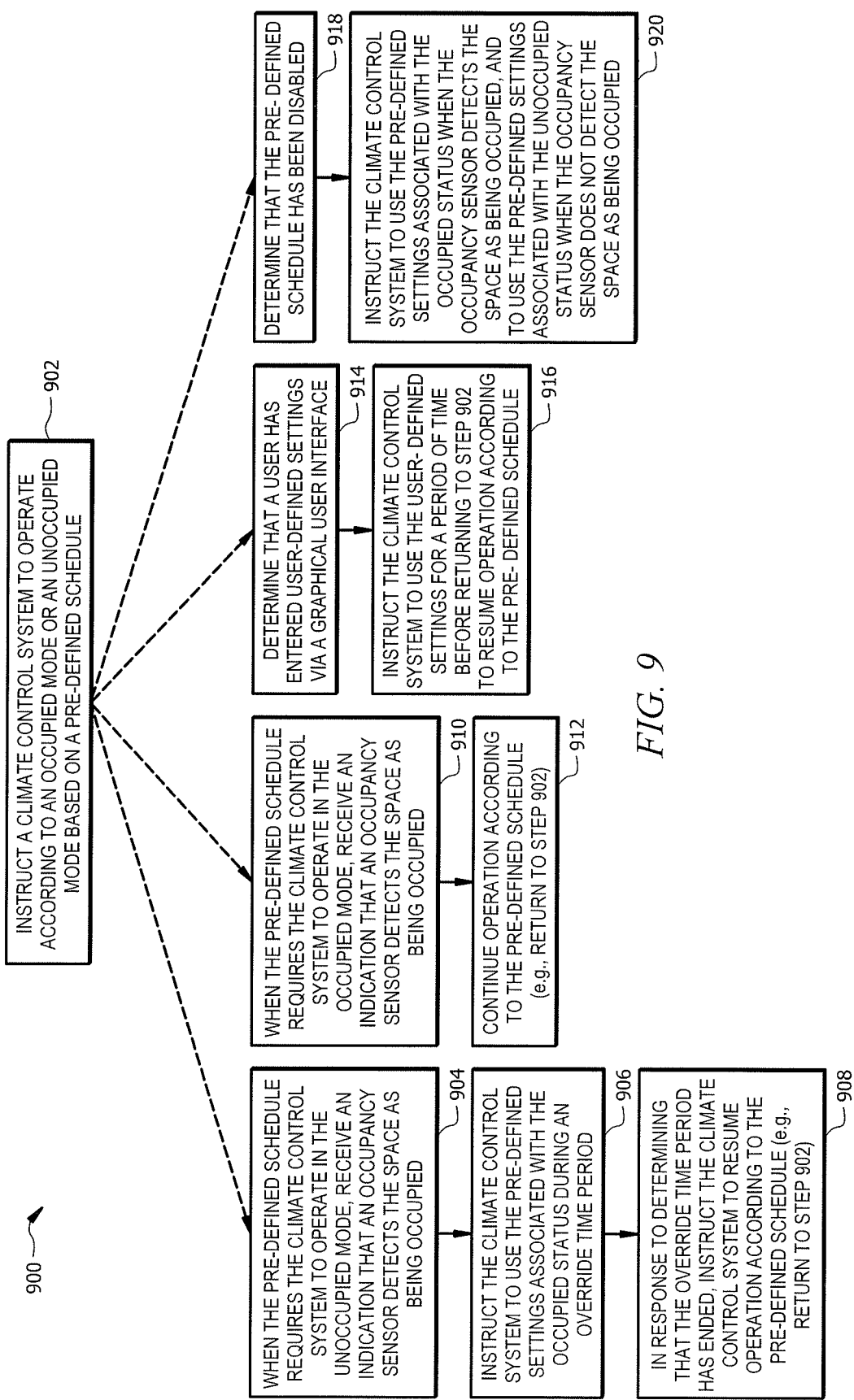
FIG. 9 is a flowchart illustrating a method that may be performed by a controller for a climate control system.

FIG. 9 is a flowchart illustrating a method 900 that may be performed by a controller for a climate control system. As an example, in certain embodiments, the controller may be a thermostat (e.g., sensor/thermostat 210). The thermostat may be located within a conditioned space. In certain embodiments, the thermostat comprises a graphical user interface that accepts inputs from a user and displays outputs to the user. In other embodiments, the controller may be an controller 325 of an RTU. The RTU may be located outdoors/outside of the conditioned space.

At step 902, the method instructs a climate control system to operate according to an occupied mode or an unoccupied mode based on a pre-defined schedule. The occupied mode uses pre-defined settings associated with an occupied status, and the unoccupied mode uses pre-defined settings associated with an unoccupied status. As an example, the climate control system may be configured to control the climate for a space used by a business. The pre-defined schedule may operate the climate control system according to the occupied mode during normal business hours, and the pre-defined schedule may operate the climate control system according to the unoccupied mode outside of normal business hours.

In certain embodiments, the pre-defined settings associated with the occupied status may be configured based on comfort of the occupant, and the pre-defined settings associated with the unoccupied status may be configured based on energy efficiency. As one example, when the climate control system is performing cooling (e.g., during summer), the pre-defined settings associated with the occupied status may be configured to cool the space according to a setpoint of 72 degrees Fahrenheit, whereas the pre-defined settings associated with the unoccupied status may be configured to cool the space according to a setpoint of 80 degrees Fahrenheit. As another example, when the climate control system is performing heating (e.g., during winter), the pre-defined settings associated with the occupied status may be configured to heat the space according to a setpoint of 75 degrees Fahrenheit, whereas the pre-defined settings associated with the unoccupied status may be configured to heat the space according to a setpoint of 68 degrees Fahrenheit.

At step 904, the method receives an indication that an occupancy sensor detects the space as being occupied. The indication is received when the pre-defined schedule requires the climate control system to operate in the unoccupied mode (such as after normal business hours). Any suitable occupancy sensor may be used to detect occupancy. As an example, an occupancy sensor may detect an activity, such as an occupant entering commands into a thermostat, an occupant interacting with other equipment that is in communication with the climate control system (e.g., the climate control system receives a notification if the occupant turns on lights or triggers a motion detector within the conditioned space), or a sensor detecting that the carbon dioxide level within the conditioned space has exceeded a threshold.

At step 906, in response to receiving the indication in step 904 that the occupancy sensor detects the space as being occupied, the method instructs the climate control system to use the pre-defined settings associated with the occupied status during an override time period. For example, prior to receiving the indication that the space is occupied, the climate control system may be configured to cool the space according to the setpoint of 80 degrees Fahrenheit (e.g., for energy efficiency) based on the pre-defined schedule. In response to receiving the indication that the space is occupied, the climate control system may be instructed to cool the space according to the setpoint of 72 degrees Fahrenheit (e.g., for occupant comfort). Any suitable override time period may be used. For example, the override time period may correspond to a pre-defined time period (e.g., 15 minutes, 30 minutes, 45 minutes, 60 minutes, or N minutes), or the override time period may continue for as long as the occupancy sensor detects the space as being occupied.

At step 908, in response to determining that the override time period has ended, the method instructs the climate control system to resume operation according to the pre-defined schedule. Thus, if the pre-defined schedule has scheduled the current time for unoccupied mode, the method instructs the climate control system to resume using the pre-defined settings associated with the unoccupied mode. Continuing with the example discussed above, if the current time is after business hours, the method instructs the climate control system to resume cooling the space according to the setpoint of 80 degrees Fahrenheit.

At step 910, the method receives a second indication that the occupancy sensor detects the space as being occupied. The second indication received when the pre-defined schedule requires the climate control system to operate in the occupied mode (e.g., during normal business hours). In response to receiving the second indication, the method allows the climate control system to continue operation according to the pre-defined schedule (step 912). Thus, the method can ignore the occupancy sensor information received during the time periods that the pre-defined schedule has scheduled the space in occupied mode.

At step 914, the method determines that a user has entered user-defined settings via a graphical user interface, and at step 916, the method instructs the climate control system to use the user-defined settings for a period of time before instructing the climate control system to resume operation according to the pre-defined schedule. The period of time can be the same or different than the override time period discussed with respect to step 906. In certain embodiments, the period of time can be pre-defined. In certain embodiments, the period of time can be entered by the user. Steps 914-916 allow the user to configure user-defined setpoints, e.g., based on the user's current comfort level. As an example, if the user is too cold when the climate control system is cooling the space according to the occupied mode setpoint of 72 degrees Fahrenheit, the user may request the climate control system to temporarily operate according to a setpoint of 74 degrees Fahrenheit.

At step 918, the method determines that the pre-defined schedule has been disabled (e.g., based on a command received from the user). In response, at step 920, the method instructs the climate control system to use the pre-defined settings associated with the occupied status when the occupancy sensor detects the space as being occupied, and to use the pre-defined settings associated with the unoccupied status when the occupancy sensor does not detect the space as being occupied.

The method described with respect to FIG. 9 may have more or fewer steps, and the steps may be performed in any suitable order. As an example, steps 904-908 may be optional in certain embodiments (e.g., depending on whether an indication is received from an occupancy sensor during a scheduled unoccupied mode). As another example, steps 910-912 may be optional in certain embodiments (e.g., depending on whether an indication is received from an occupancy sensor during a scheduled occupied mode). As another example, steps 914-916 may be optional in certain embodiments (e.g., depending on whether a user decides to enter user-defined settings). As another example, steps 918-

920 may be optional in certain embodiments (e.g., depending on whether the user decides to disable the pre-defined schedule).

Thus, the steps performed after step 902 may depend on the type of input received by the controller. For example, if the input received after step 902 is an indication of actual occupancy received from a sensor during a scheduled unoccupied mode, the method may proceed to steps 904-908 and then return to step 902. If the input received after step 902 is an indication of actual occupancy received from a sensor during a scheduled occupied mode, the method may proceed to steps 910-912 and then return to step 902. If the input received after step 902 is user-defined settings, the method may proceed to steps 914-916 and then return to step 902. If the input received after step 902 disables the pre-defined schedule, the method may proceed to steps 918-920.

Figure 10:
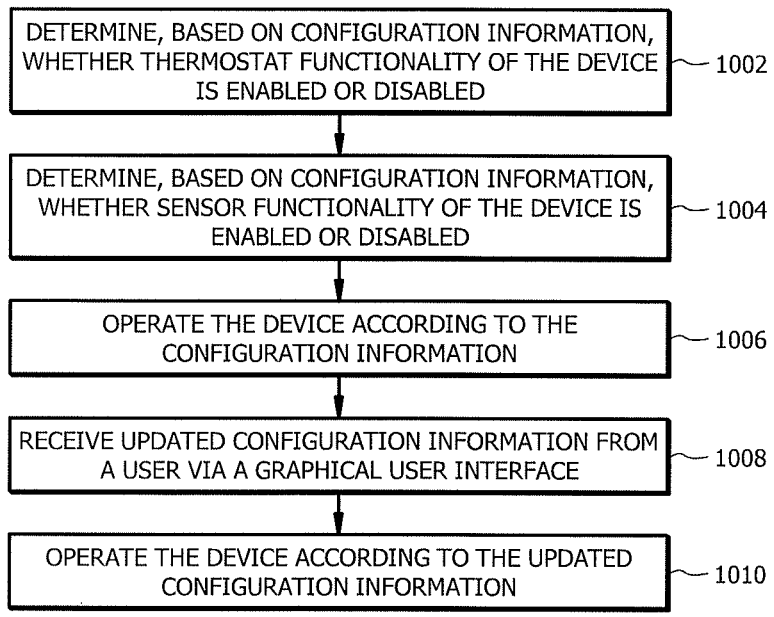
FIG. 10 is a flowchart illustrating a method that may be performed by a device with configurable thermostat functionality and sensing functionality.

FIG. 10 is a flowchart illustrating a method 1000 that may be performed by a device used in a climate control system. For example, the device may be a sensor/thermostat 210 described above. At step 1002, the method determines, based on configuration information, whether thermostat functionality of the device is enabled or disabled. When the device's thermostat functionality is enabled, certain embodiments operate the device based on internal setpoints within the device. For example, the internal setpoints may comprise temperature setpoints that the device uses to determine climate control commands to send to an RTU. The climate control commands can be determined based on sensor data received from one or more sensors. In certain embodiments, when the sensor functionality is enabled, the sensor data is received at least in part from an internal sensor of the device. In addition, or in the alternative, sensor data may be received from one or more external sensors (such as another sensor/thermostat 210 configured with only sensor functionality enabled). When the device's thermostat functionality is disabled, certain embodiments use an external controller (separate from the device) to control the climate control commands.

At step 1004, the method determines, based on the configuration information, whether sensor functionality of the device is enabled or disabled. In certain embodiments, the determination may be made implicitly (e.g., it may be determined that the sensor functionality is enabled if the device includes a sensor). In other embodiments, the determination may be made explicitly (e.g., based a parameter that a user has configured to enable the sensor functionality). When the sensor functionality is enabled, the device may report sensor data to a controller within the device (e.g., when the device's own thermostat functionality is also enabled) or to an external controller (e.g., when the device's own thermostat functionality is disabled). The external controller could be a centralized thermostat, such as another sensor/thermostat 210 with its thermostat functionality enabled, or a controller 325 of an RTU. The sensor data may be sent to the external controller via a network.

At step 1006, the method operates the device according to the configuration information. In certain embodiments, the device may be configured to operate as a thermostat, a sensor, or both depending on the configuration information.

At step 1008, the method receives updated configuration information from a user via a graphical user interface. The updated configuration information changes an enabled/disabled status of the thermostat functionality or the sensor functionality. Changing the enabled/disabled status of the thermostat functionality comprises enabling the thermostat functionality (e.g., if the thermostat functionality was previously disabled) or disabling the thermostat functionality (e.g., if the thermostat functionality was previously enabled). As an example, the user may decide to change the thermostat functionality from enabled to disabled if an external controller (such as another sensor/thermostat 210) is operating the setpoints for the climate control system. Thus, the device can be configured as only a sensor that reports sensor data to the external controller configured with its own setpoints. As another example, the user may decide to change the thermostat functionality from disabled to enabled if the user decides that the device should operate based on internal setpoints within the device. Changing the enabled/disabled status of the sensor functionality comprises enabling the sensor functionality (e.g., if the sensor functionality was previously disabled) or disabling the sensor functionality (e.g., if the sensor functionality was previously enabled). At step 1010, the method operates the device according to the updated configuration information.

As discussed above, the device may include one or more internal sensors. In certain embodiments, one of the internal sensors comprises a carbon dioxide sensor. In certain embodiments, when the sensor functionality is enabled, the device reports a detected carbon dioxide level to an external controller (such as controller 325 of an RTU) and the external controller controls ventilation of the climate control system based on the detected carbon dioxide level. In certain embodiments, when the sensor functionality and the thermostat functionality of the device are both enabled, the device itself detects a carbon dioxide level and controls ventilation of the climate control system based on the detected carbon dioxide level.

In certain embodiments, the device is further operable to determine a number of sensors associated with the climate control system and to adjust a resistance for each sensor based on the number of sensors. The device may be further operable to automatically adjust the resistance for each sensor in response to a determination that at least one sensor has been added to or removed from the climate control system. An example is discussed above with respect to FIG. 4B.

The method described with respect to FIG. 10 may have more or fewer steps, and the steps may be performed in any suitable order. As an example, steps 1008-1010 may be optional in certain embodiments (e.g., depending on whether the user decides to update the configuration information).

Figure 11:
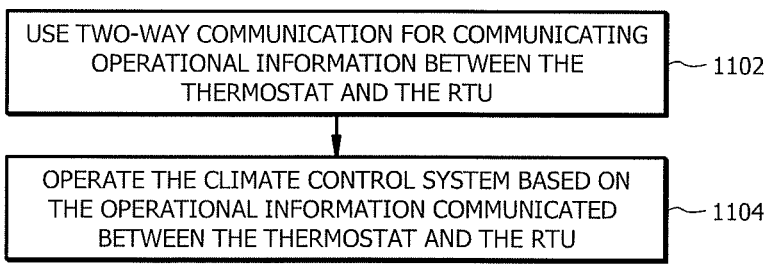
FIG. 11 is a flowchart illustrating a method for two-way communication between a thermostat and a rooftop unit.

FIG. 11 is a flowchart illustrating a method 1100 using two-way communication between a thermostat and at least one RTU within a climate control system. At step 1102, the method uses two-way communication for communicating operational information between the thermostat and the RTU. For example, the two-way communication may be exchanged between a sensor/thermostat 210 and a controller 325 of the RTU via any suitable network. The two-way communication comprises communicating first operational information from the thermostat to the RTU and communicating second operational information from the RTU to the thermostat.

The operational information comprises one or more climate control commands, setpoints, configuration information (e.g., capabilities related to climate control, configured settings related to climate control, etc.), diagnostics (e.g., status, alerts, error codes, etc.), and/or sensor data. As one example, in certain embodiments, the first operational information communicated from the thermostat to the RTU indicates one or more temperature setpoints that allow the RTU to operate heating or cooling on its own. As another example, in certain embodiments, the first operational information communicated from the thermostat to the RTU comprises sensor data based on a temperature, humidity level, or carbon dioxide level that the thermostat receives from one or more sensors, such as sensors located within a conditioned space. As another example, in certain embodiments, the second operational information communicated from the RTU to the thermostat comprises sensor data based on a temperature (such as an outdoor air temperature or a refrigerant discharge temperature), a humidity level (such as an outdoor humidity level), or other sensor data that the RTU receives from one or more sensors. As yet another example, in certain embodiments, the second operational information communicated from the RTU to the thermostat comprises diagnostics (e.g., status, alerts, error codes, etc.).

At step 1104, the method operates the climate control system based on the operational information communicated between the thermostat and the RTU. Operating the climate control system may comprise, for example, increasing or decreasing heating, cooling, or ventilation, or modifying a configured setting or setpoint. Additionally, in certain embodiments, the thermostat may update a graphical user interface to display information received from the RTU, such as configuration information associated with the RTU (e.g., capabilities, configured settings, etc.) or diagnostics associated with the RTU (e.g., status, alerts, error codes, etc.).

In certain embodiments, operating the climate control system comprises operating one or more of the components discussed above with respect to FIGS. 3A-3B. As one example, in certain embodiments, the thermostat may operate the climate control system by including a climate control command in the first operational information. The climate control command can be based on capability information that the thermostat receives from the RTU (the capability information indicates one or more climate control commands supported by the RTU). As another example, in certain embodiments, the thermostat may operate the climate control system by including setpoints in the first operational information that the RTU uses when determining whether to increase or decrease heating, cooling, or ventilation. Thus, in certain embodiments, the RTU may operate the climate control system by applying climate control commands or setpoints received from the thermostat.

In certain embodiments, the thermostat is further operable to detect when it is connected to multiple RTUs. The thermostat can automatically adjust dampers for each RTU and/or adjust heating/cooling votes for each RTU based on the number of RTUs connected to the thermostat. Additionally, in certain embodiments, the thermostat is further operable to detect whether the RTUs are configured for zoned operation or unzoned operation. The thermostat can then automatically adjust dampers for each RTU and/or adjust heating/cooling votes for each RTU based on whether the RTUs are configured for zoned operation or unzoned operation. Zoned operation comprises using each RTU to control the climate in a different space, and unzoned operation comprises using each RTU to control the climate in the same space.

Modifications, additions, or omissions may be made to any of the methods disclosed herein. These methods may include more, fewer, or other steps, and steps may be performed in parallel or in any suitable order. While discussed as certain components of the climate control system controller performing the steps, any suitable component or combination of components may perform one or more steps of these methods. Certain examples have been described using the modifiers "first" or "second" (e.g., first indication, second indication, first operational information, second operational information). The modifiers do not require any particular sequence (e.g., the second indication can be received before or after the first indication, and the second operational information can be communicated before or after the first operational information).

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. A controller for a climate control system, the controller operable to:
   instruct a climate control system to operate according to an occupied mode or an unoccupied mode based on a pre-defined schedule, wherein the occupied mode uses pre-defined settings associated with an occupied status and the unoccupied mode uses pre-defined settings associated with an unoccupied status;
   receive an indication that an occupancy sensor detects a space as being occupied, the indication received when the pre-defined schedule requires the climate control system to operate in the unoccupied mode;
   in response to receiving the indication that the occupancy sensor detects the space as being occupied, instruct the climate control system to use the pre-defined settings associated with the occupied status during an override time period;
   wherein the override time period corresponds to a pre-defined time period and in response to determining that the pre-defined time period has ended the controller instructs the climate control system to resume operation according to the pre-defined schedule associated with the unoccupied status regardless of whether the occupancy sensor detects the space as being occupied.

2. The controller of claim 1, further operable to:
   receive a second indication that the occupancy sensor detects the space as being occupied, the second indication received when the pre-defined schedule requires the climate control system to operate in the occupied mode;
   in response to receiving the second indication, continue operation according to the pre-defined schedule.

3. The controller of claim 1, further operable to:
   in response to determining that the pre-defined schedule has been disabled:
      instruct the climate control system to use the pre-defined settings associated with the occupied status when the occupancy sensor detects the space as being occupied; and
      instruct the climate control system to use the pre-defined settings associated with the unoccupied status when the occupancy sensor does not detect the space as being occupied.

4. The controller of claim 1, wherein the controller is further operable to:
   determine that a user has entered user-defined settings via a graphical user interface; and
   instruct the climate control system to use the user-defined settings for a period of time before instructing the climate control system to resume operation according to the pre-defined schedule.

5. The controller of claim 1, wherein the controller comprises a carbon dioxide sensor integrated with the controller and the indication that the occupancy sensor detects the space as being occupied corresponds to the carbon dioxide sensor detecting that a carbon dioxide level associated with the space has exceeded a threshold.

6. A method, comprising:
instructing a climate control system to operate according to an occupied mode or an unoccupied mode based on a pre-defined schedule, wherein the occupied mode uses pre-defined settings associated with an occupied status and the unoccupied mode uses pre-defined settings associated with an unoccupied status;
receiving an indication that an occupancy sensor detects a space as being occupied, the indication received when the pre-defined schedule requires the climate control system to operate in the unoccupied mode;
in response to receiving the indication that the occupancy sensor detects the space as being occupied, instructing the climate control system to use the pre-defined settings associated with the occupied status during an override time period; and
wherein the override time period corresponds to a pre-defined time period and in response to determining that the pre-defined time period has ended, instructing the climate control system to resume operation according to the pre-defined schedule associated with the unoccupied status regardless of whether the occupancy sensor detects the space as being occupied.

7. The method of claim 6, further comprising:
receiving a second indication that the occupancy sensor detects the space as being occupied, the second indication received when the pre-defined schedule requires the climate control system to operate in the occupied mode;
in response to receiving the second indication, continuing operation according to the pre-defined schedule.

8. The method of claim 6, further comprising:
in response to determining that the pre-defined schedule has been disabled:
instructing the climate control system to use the pre-defined settings associated with the occupied status when the occupancy sensor detects the space as being occupied; and
instructing the climate control system to use the pre-defined settings associated with the unoccupied status when the occupancy sensor does not detect the space as being occupied.

9. The method of claim 6, further comprising:
determining that a user has entered user-defined settings via a graphical user interface; and
instructing the climate control system to use the user-defined settings for a period of time before instructing the climate control system to resume operation according to the pre-defined schedule.

10. The method of claim 6, wherein the indication that the occupancy sensor detects the space as being occupied is based on detecting that a carbon dioxide level associated with the space has exceeded a threshold.

11. A non-transitory computer readable medium comprising logic that, when executed by processing circuitry, causes the processing circuitry to perform operations comprising:
instructing a climate control system to operate according to an occupied mode or an unoccupied mode based on a pre-defined schedule, wherein the occupied mode uses pre-defined settings associated with an occupied status and the unoccupied mode uses pre-defined settings associated with an unoccupied status;
receiving an indication that an occupancy sensor detects a space as being occupied, the indication received when the pre-defined schedule requires the climate control system to operate in the unoccupied mode;
in response to receiving the indication that the occupancy sensor detects the space as being occupied, instructing the climate control system to use the pre-defined settings associated with the occupied status during an override time period; and
wherein the override time period corresponds to a pre-defined time period and in response to determining that the pre-defined time period has ended, instructing the climate control system to resume operation according to the pre-defined schedule associated with the unoccupied status regardless of whether the occupancy sensor detects the space as being occupied.

* * * * *